July 17, 1928.
L. A. DEICKEN
1,677,276
FOOD TRAY
Filed Dec. 29, 1926
2 Sheets-Sheet 1
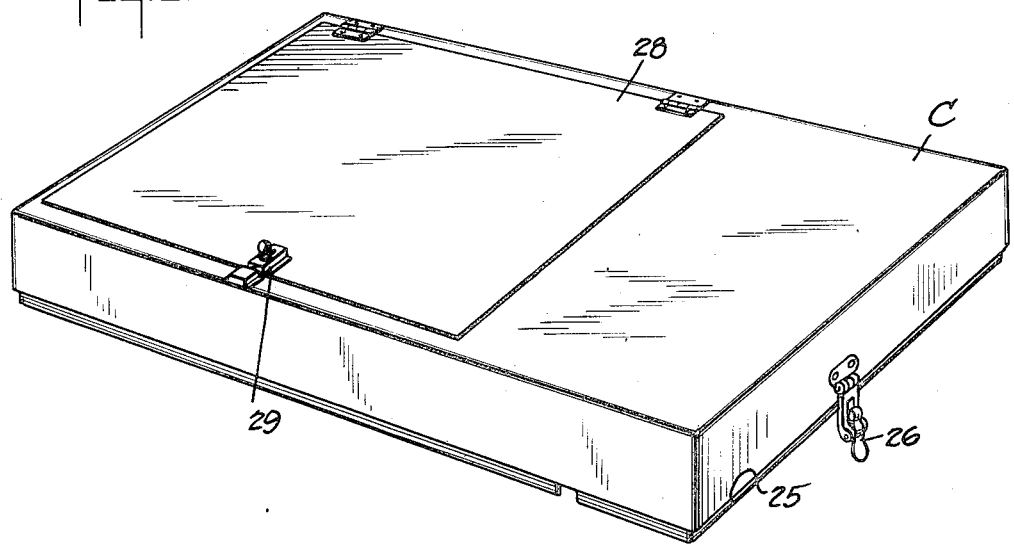
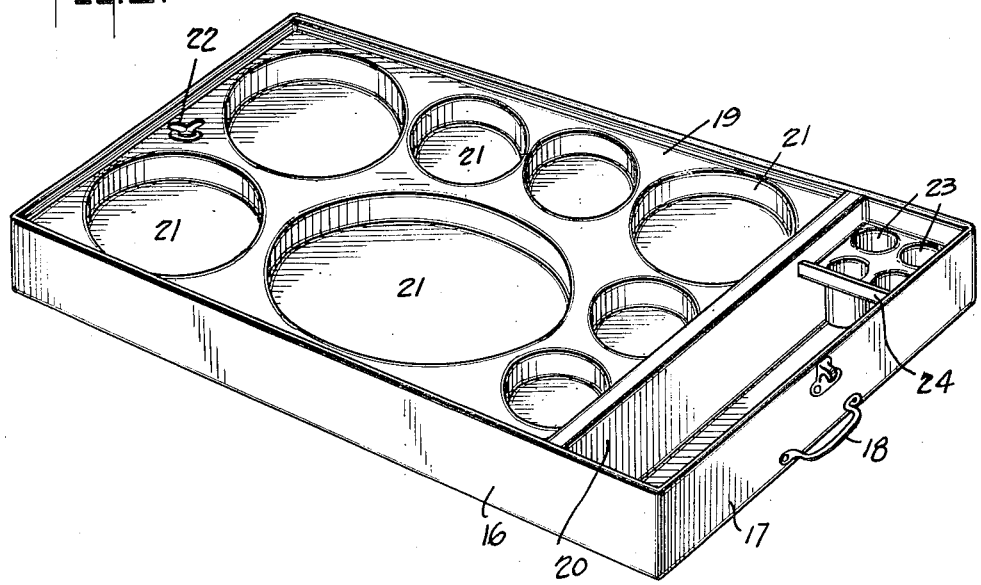
INVENTOR
LOUIS A. DEICKEN
BY Munn & Co.
ATTORNEY

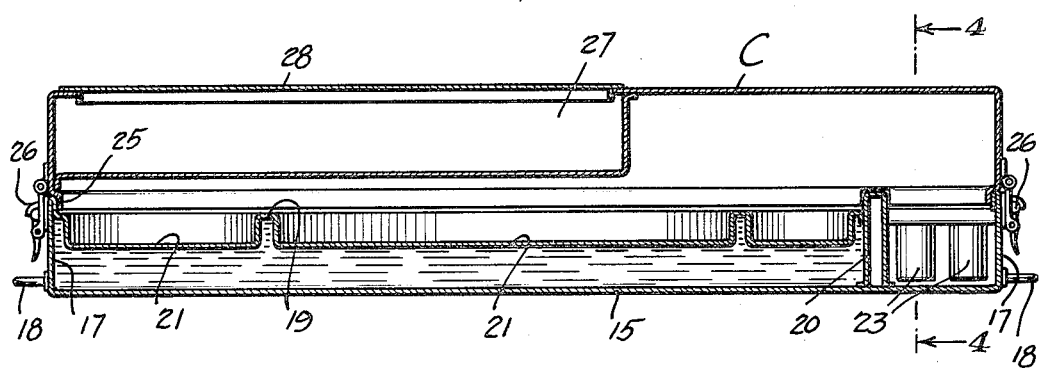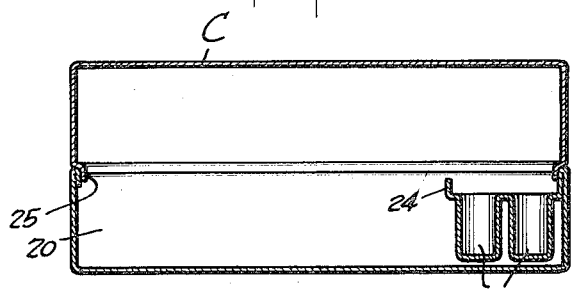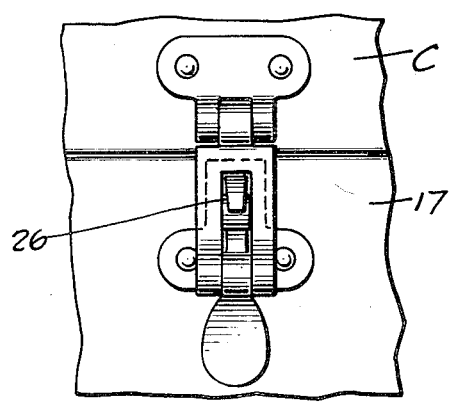

Patented July 17, 1928.

1,677,276

UNITED STATES PATENT OFFICE.

LOUIS A. DEICKEN, OF LOS ANGELES, CALIFORNIA.

FOOD TRAY.

Application filed December 29, 1926. Serial No. 157,755.

My invention relates to and has for its purpose the provision of a food tray by which various prepared foods constituting a meal for one or more individuals and the necessary dishes, spoons, forks, etc. can be conveniently transported from a restaurant or other source of preparation to the home of a consumer, the tray having provision for maintaining certain of the foods hot and others cold, as required, so that when delivered to the consumer they will possess the same palatable properties as when served in a restaurant.

I will describe only one form of food tray embodying my invention, and will then point out the novel features thereof in claims.

In the drawings

Figures 1 and 2 are perspective views showing one form of food tray, all embodying my invention, Figure 2 showing the body of the tray and Figure 1 the cover;

Figure 3 is a longitudinal sectional view of the complete tray, with the cover in applied position on the body;

Figure 4 is a transverse sectional view taken on the line 4—4 of Figure 3;

Figure 5 is an enlarged fragmentary view showing in front elevation one of the latching devices for the cover.

Referring specifically to the drawings, my invention in its present embodiment comprises a tray body preferably of rectangular formation, as shown in Figure 2, and contructed of sheet metal or other suitable material, such body including a bottom wall 15 formed integrally or separately as desired, with side walls 16 and end walls 17, the latter walls being provided with handles 18 to facilitate carrying of the tray as a whole. The tray body also includes a top wall or partition 19 which is suitably secured in spaced relation to the bottom wall 15. This partition 19 terminates short of one end of the tray body where it is secured to a transversely and vertically disposed double wall partition 20 secured to the bottom and side walls and in spaced relation to the adjacent end wall. The top wall 19 is constructed to provide pockets 21 of various sizes and configurations as best suited for the reception of the various forms of cooked foods. Any one pocket is separate and distinct from the others and is sufficiently deep to receive and maintain a particular food separate from the foods contained in the other pockets so that the tray can be transported without fear of the foods intermixing.

The association of the top wall 19 with the bottom, side and end walls and the partition 20 is such as to provide a chamber between the top and bottom walls into which hot water or any other suitable heated fluid can be introduced through a filling opening normally closed by a plug 22, (Figure 2). With hot water in the chamber the walls of the pockets 21 are as a consequence heated, thereby maintaining any hot foods introduced into the pockets hot for relatively long periods of time in order that such foods may be transported by the tray from a restaurant to the domicile of the consumer without fear of the foods becoming cold. It will of course be understood that the heated water when cold can be removed through the filling opening and freshly heated water substituted.

That portion of the tray between the partition 20 and the adjacent end wall of the body constitutes a compartment in which cracked ice may be contained and cold solids or any other foods which are to be served cold can be placed in dishes on the cracked ice and thus maintained cold during transit of the tray. One end of this compartment contains a plurality of receptacles or cups 23 in which condiments can be held. These receptacles are provided with a transverse lip 24 which is upturned and serves to brace the partition 20, it being noted that the partition by being formed of two walls provides a dead air space therebetween which serves to insulate the ice in the chamber against the hot water.

The food tray also includes a cover designated generally at C and constructed at its lower side with a depending flange 25 which engages with the inner side of the upper edge of the tray body so as to properly center the cover on the body. The cover can be secured in position upon the tray by means of latching devices 26 at the opposite ends thereof and with portions on the cover and other portions on the tray body. This cover C is constructed to provide a compartment 27 in which dishes, knives, forks, etc. can be stored and transported with the foods. This compartment is normally closed by a hinge cover 28 secured in closed position by a latch 29. By virtue of the arrangement of the compartment it will be clear that with the cover C in applied position upon the tray body, the heat radiating from the heating medium within the tray body will serve to maintain the dishes contained in the chamber 27 hot, or at least warm. It will of course be understood that the use of dishes is not necessary, as the pockets 21 can themselves serve as dishes if desired.

Although I have herein shown and described only one form of food tray embodying my invention, it is to be understood that various changes and modifications may be made therein without departing from the spirit of the invention, and the spirit and scope of the appended claims.

I claim:

1. A food tray comprising a rectangular tray body having a vertical and double walled transverse partition adjacent one end for dividing the body into a plurality of compartments, one of which is provided with a top wall having food receiving pockets and forming a closed chamber adapted for the reception of a heating fluid by which heating of the pockets and the food contained therein is effected, the other compartment having an open top and adapted for the reception of cold foods, said last compartment having at one end a plurality of cups adapted to receive condiments, a flanged cover having a depending offset lip around the free edge of its flange adapted for interfitting engagement within the side walls of the body so as to support the cover on the body, said cover having a dish and cutlery receiving compartment therein accessible from its outer side, and provided with a hinged door.

2. A food tray comprising a tray body having an insulating partition therein for dividing the body into a plurality of compartments, one of which is provided with a top wall having food receiving pockets and forming a closed chamber adapted for the reception of a heating fluid by which heating of the pockets and the food contained therein is effected, the other compartment having an open top and adapted for the reception of cold foods and condiments, a flanged cover for the tray body having a compartment accessible from its outer side in which dishes and cutlery are adapted to be stored, and a door normally closing the last mentioned compartment.

LOUIS A. DEICKEN.